United States Patent [19]

Saegusa et al.

[11] Patent Number: 4,876,708
[45] Date of Patent: Oct. 24, 1989

[54] CORDLESS TELEPHONE SYSTEM

[75] Inventors: Noboru Saegusa; Toshihiro Hara; Ryoji Kawasaki, all of Tokyo; Kazuyuki Tate, Aichi; Syoji Huse, Tokyo; Koji Ono, Tokyo, all of Japan

[73] Assignees: NEC Corporation; Nippon Telegraph and Telephone Corp., both of Tokyo; Kabushiki Kaisha Toshiba, Kanagawa, all of Japan

[21] Appl. No.: 112,927

[22] Filed: Oct. 27, 1987

[30] Foreign Application Priority Data

Oct. 30, 1986 [JP] Japan .................. 61-258745

[51] Int. Cl.⁴ .................. H04M 11/00; H04M 1/00
[52] U.S. Cl. .................. 379/61; 379/63; 379/162; 379/393
[58] Field of Search .................. 379/61-62, 379/57-58, 63, 159, 160, 162-163, 393

[56] References Cited

U.S. PATENT DOCUMENTS

| | | | |
|---|---|---|---|
| 4,640,987 | 2/1987 | Tsukada et al. | 379/62 |
| 4,650,931 | 3/1987 | Tsukada et al. | 379/61 |
| 4,706,274 | 11/1987 | Baker et al. | 379/61 |

Primary Examiner—Jin F. Ng
Assistant Examiner—David H. Kim
Attorney, Agent, or Firm—Sughrue, Mion, Zinn, Macpeak & Seas

[57] ABSTRACT

A cordless telephone system includes a connector connected to a subscriber telephone line and at least one radio telephone set through a radio channel to establish or hold a communication channel between the ratio telephone set and a subscriber. The connector includes a control unit incorporating a timer. The control unit sets the system in a self hold state in which the radio channel is kept connected or a complete hold state in which the radio channel is disconnected on the basis of a hold signal from the radio telephone set, the presence/absence of a radio reception signal within a predetermined period of time preset in the timer, and the type of reception signal.

6 Claims, 10 Drawing Sheets

CORDLESS TELEPHONE SYSTEM

BACKGROUND OF THE INVENTION

The present invention relates to a cordless telephone system and, more particularly, to a hold control system in a cordless telephone system having a hold function.

Figure 1:
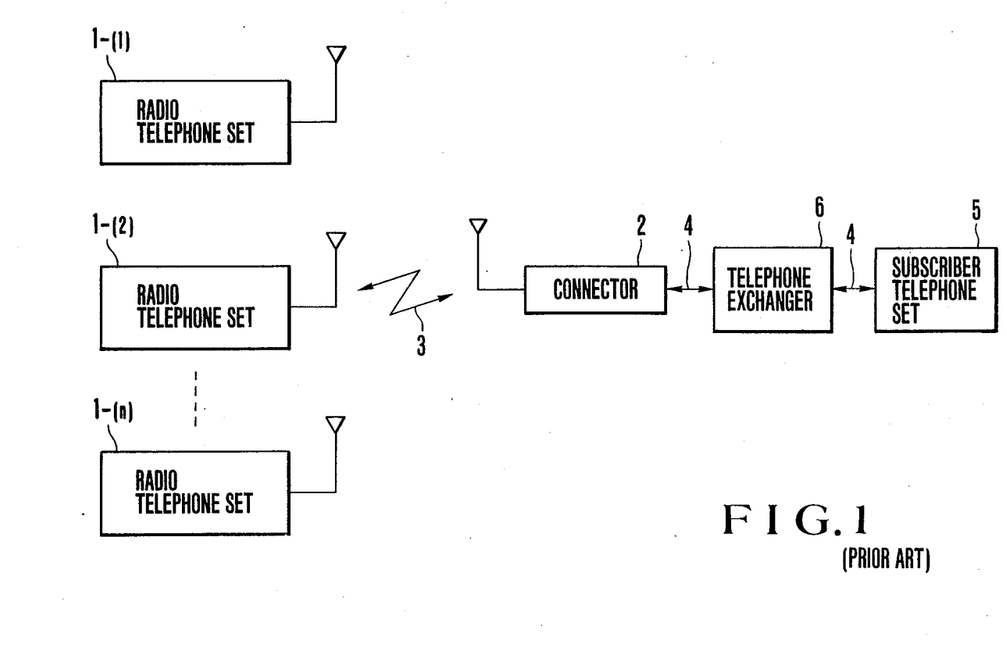
FIG. 1 is a block diagram showing a configuration of a conventional cordless telephone system.

As shown in FIG. 1, a conventional cordless telephone system having a hold function comprises a plurality of radio telephone sets 1 having an identical arrangement, a connection apparatus or connector 2 coupled to the radio telephone sets 1 via a radio channel 3, and a subscriber telephone set 5 connected to the connector 2 through a subscriber line 4 and a telephone exchanger 6.

Each radio telephone set 1 includes dial keys, a talk button, a talk completion button, and a hold button. The connector 2 includes a talk/hold switch for switching between the talk mode and the hold mode, and a controller for controlling the operation of the talk/hold switch.

Figure 2:
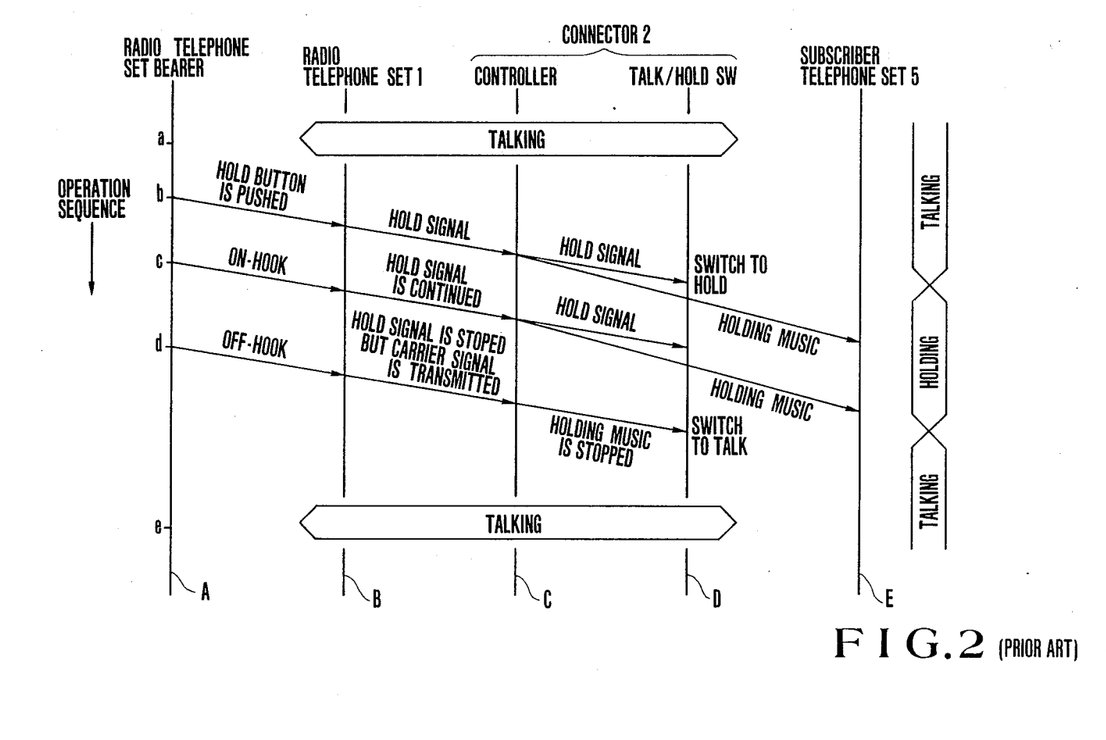
FIG. 2 is a sequence diagram for explaining hold control operation according to the prior art.

FIG. 2 is a sequence diagram for explaining the hold control operation of the cordless telephone system having a hold function.

Referring to FIG. 2, vertical lines A, B, C, D, and E represent a person or bearer using the radio telephone set 1, the radio telephone set 1, the controller in the connector 2, the talk/hold switch in the connector 2, and the subscriber telephone set 5 and its bearer, respectively. The operation sequence progresses downward in FIG. 2. Continuation of arrows represents a chain of operations of portions A to E which are caused by one operation by the radio telephone set bearer A.

When a communication channel is being established and talking is performed between the radio telephone set 1 and the subscriber telephone set 5 in an operation sequence and the radio telephone set bearer A depresses the hold button in the radio telephone set 1 in a sequence b, a radio hold signal is transmitted from the radio telephone set 1 to the connector 2. The controller in the connector 2 sends the hold signal to the talk/hold switch to set it in the hold position. At the same time, holding tone or music is sent to the subscriber telephone set 5. The communication channel is then held in the hold state. When the radio telephone set bearer A on-hooks the radio telephone set 1 in an operation sequence c, the radio telephone set 1 outputs the hold signal to cause the controller in the connector 2 to generate and send the holding music to the subscriber telephone set 5. When the radio telephone set bearer A off-hooks the radio telephone set 1 in an operation sequence d, the radio telephone set 1 stops sending the hold signal. In this case, the transmitter in the radio telephone set 1 transmits only a radio carrier signal. The controller in the connector 2 sets the talk/hold switch in the talk position and stops sending the holding music. As a result, the hold state of the communication channel is set in the busy state in a sequence e.

In the conventional hold control system described above, the radio channel is maintained even during the hold period. However, since talking is not performed in the hold period, the radio channel need not be maintained. This mode of operation is not preferable from the viewpoint of effective utilization of radio or electric waves.

In a system having a plurality of radio telephone sets 1, a demand has arisen to allow an operation wherein the communication channel held in the hold state by one radio telephone set, e.g., 1-(1) can be released by another radio telephone set, e.g., 1-(2) to restart talking. However, the demand cannot be satisfied.

SUMMARY OF THE INVENTION

It is an object of the present invention to eliminate the conventional problems described above and to provide a cordless telephone system capable of interrupting sending of an electric wave in the hold state in which the radio channel need not be maintained and capable of releasing the hold state from another radio telephone set to restart talking.

In order to achieve the above object of the present invention, there is provided a cordless telephone system comprising a connector connected to a subscriber telephone set, and at least one radio telephone set connected to the connector through a radio channel, the at least one radio telephone set transmitting, through the radio channel, to the connector a hold signal, an off-hook signal, and an on-hook signal in response to depressions of a hold button, a talk button, and a talk completion button, respectively.

The connector has radio transmitting/receiving unit, a switching unit, a holding unit and a control unit for controlling the transmitting/receiving unit, the switching unit and the holding unit in response to the hold signal, the off-hook signal, and the on-hook signal to control the system such that; when the hold signal is received after a communication channel is established, the communication channel is set in a first hold state in which the radio channel is kept connected; within a first predetermined period of time after the first hold state is started, when the hold signal is received or no radio reception signal is detected, the communication channel is released, but when the on-hook signals is received, the communication channel is set in a second hold state in which the radio channel is disconnected; within a second predetermined period of time after the second hold state is started, when the off-hook signal is received, the communication channel is changed from the second hold state to the first hold state; and when a radio reception signal is not detected within the second predetermined period of time, the communication channel is forcibly disconnected and set in a stand-by state.

BRIEF DESCRIPTION OF THE DRAWINGS

FIG. 11 is a flow chart for explaining the control operation of the present invention.

DETAILED DESCRIPTION OF THE PREFERRED EMBODIMENT

A preferred embodiment of the present invention will be described with reference to the accompanying drawings.

The system configuration of the cordless telephone system according to the present invention is the same as that in FIG. 1, and a detailed description thereof will be omitted. The same reference numerals as in FIG. 1 denote the same parts in the embodiment.

Figure 3:
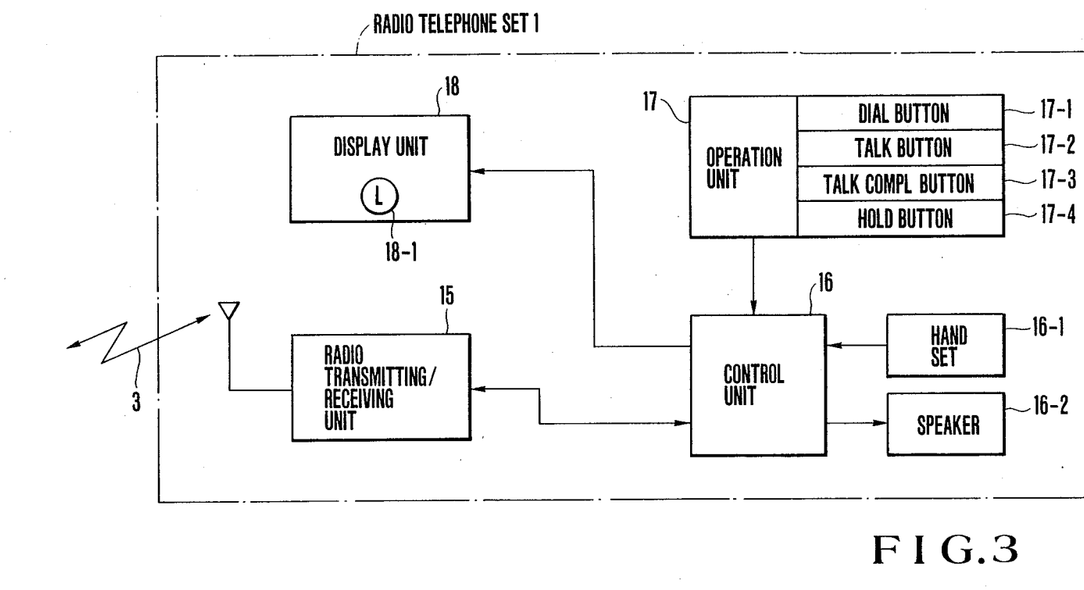
FIG. 3 is a block diagram of a radio telephone set used in a cordless telephone system according to an embodiment of the present invention.

FIG. 3 is a radio telephone set 1 according to the embodiment of the present invention. The radio telephone set 1 comprises a radio transmitting/receiving unit 15, a control unit 16, an operation unit 17, and a display unit 18. The radio transmitting/receiving unit 15 is caused to maintain a radio channel 3 in a self hold state (to be described later) by the control unit 16. However, in a complete hold state (to be described later), the radio transmitting/receiving unit 15 disconnects the radio channel 3. In other words, the unit 15 stops transmitting a radio or electric wave.

The operation unit 17 includes dial buttons 17-1, a talk button 17-2, a talk completion button 17-3, and a hold button 17-4. The control unit 16 generates a signal corresponding to the button operations and the signal is transmitted to a connector 2 through the radio transmitting/receiving unit 15 and the radio channel 3.

An off-hook signal is generated upon operation of the talk button 17-2, an on-hook signal is generated upon operation of the talk completion button 17-3, and a hold signal is generated upon operation of the hold button 17-4, in the same manner as in the conventional techniques.

The display unit 18 comprises a hold indicator lamp 18-1 and other lamps (not shown). The hold indicator lamp 18-1 indicates that the radio telephone set 1 is held in the self hold state by the control unit 16. The hold indicator lamp 18-1 is turned off by the control unit 16 when the complete hold state is set. The control unit 16 is connected to a handset 16-1 and a speaker 16-2 for producing a ringing tone. The speaker 16-2 is controlled to generate a hold alarm tone when the bearer forgets to reset holding.

Figure 4:
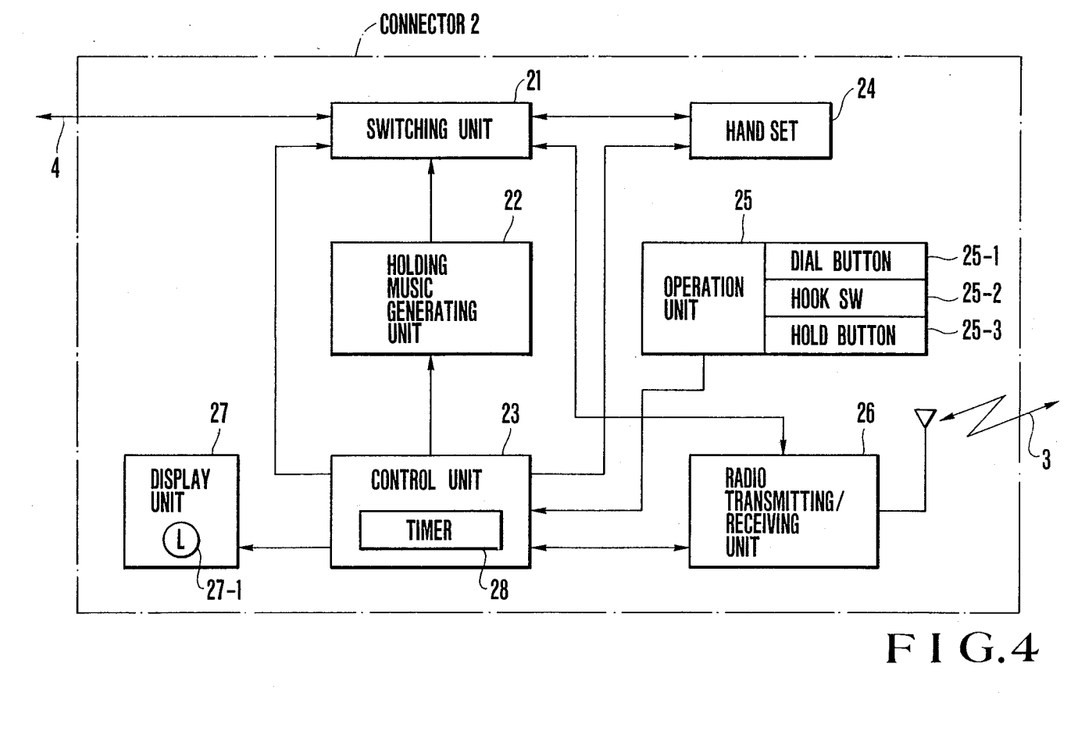
FIG. 4 is a block diagram of a connector in the cordless telephone system according to the embodiment of the present invention.

FIG. 4 shows an arrangement of the connector 2. Referring to FIG. 4, the connector 2 comprises a switching unit 21, a holding music generating unit 22, a control unit 23, a handset 24, an operation unit 25, a radio transmitting/receiving unit 26, and a display unit 27. The radio transmitting/receiving unit 26 holds the radio channel 3 in the self hold state. In the complete hold state, the transmitting/receiving unit 26 disconnects the radio channel 3. In other words, the unit 26 stops transmitting an electric wave.

The holding music generating unit 22 generates a holding tone (e.g., holding music) in the self and complete hold states to be described later and sends the holding tone to the switching unit 21.

The switching unit 21 switches a subscriber telephone line 4 in the talk or hold mode under the control of the control unit 23. When the communication channel is formed between the radio telephone set 1 and the subscriber telephone set 5, the switching unit 21 connects the subscriber telephone line 4 to the radio transmitting/receiving unit 26. In the self hold state, the switching unit 21 connects the holding music generating unit 22 to the subscriber telephone line 4 and the radio transmitting/receiving unit 26. In the complete hold state, the switching unit 21 connects the holding music generating unit 22 to the subscriber telephone line 4.

The operation unit 25 includes dial buttons 25-1, a hook switch 25-2, a hold button 25-3, and other buttons (not shown). Signals corresponding to these switches are input to the control unit 23.

The display unit 27 includes a hold indicator lamp 27-1 and other lamps (not shown) in the same manner as in the lamp 18-1 in the radio telephone set 1. The hold indicator lamp 27-1 indicates the self or complete hold state. The self and complete hold states are indicated by different modes, e.g., continuous lighting and flickering.

The control unit 23 establishes the communication channel between the connector 2 and the subscriber telephone set 5 connected to the subscriber telephone line 4, or between the radio telephone set 1 and the connector 2 through the radio channel 3. At the same time, the control unit 23 performs hold control by using a timer 28. The control unit 23 sets the communication channel in the self hold state without disconnecting the radio channel 3 in response to the hold signal received after the communication channel is connected with the radio telephone set 1. The control unit 23 then monitors the presence/absence of the radio signal received within a predetermined period of time by using the timer 28 after the self hold state is initiated. When the radio signal received at first within the predetermined period of time is the hold signal, the control unit 23 controls the switching section 21 to release the self hold state and engage the communication channel with the radio telephone set 1 again. However, when the first radio signal received within the predetermined period of time is an on-hook signal, or when the signal is not received within the predetermined period of time, the control unit 23 controls the radio transmitting/receiving unit 26 to disengage the radio channel from the radio telephone set 1. In other words, the control unit 23 causes the radio transmitting/receiving unit 26 to stop transmitting the electric wave and set the communication channel in the complete hold state. Thereafter, by using the timer 28, the control unit 23 monitors the presence/absence of a radio signal received within a predetermined period of time after the complete hold state is initiated. If a radio signal received within this predetermined period of time is an off-hook signal, the control unit 23 controls the radio transmitting/receiving unit 26 to change the complete hold state to the self hold state. However, when the radio signal is not detected within this second predetermined period of time, the control unit 23 forcibly disconnects the communication channel.

The hold control operation of the cordless telephone system according to this embodiment will be described with reference to FIGS. 5 to 11.

In the sequence diagrams shown in FIGS. 5 to 8, vertical lines A, B, C, D, and E represent a bearer of the radio telephone set 1, the radio telephone set 1, the control unit 23, the switching unit 21 and the holding music generating unit 22 in the connector 2, and the subscriber telephone set 5, respectively.

Figure 5:
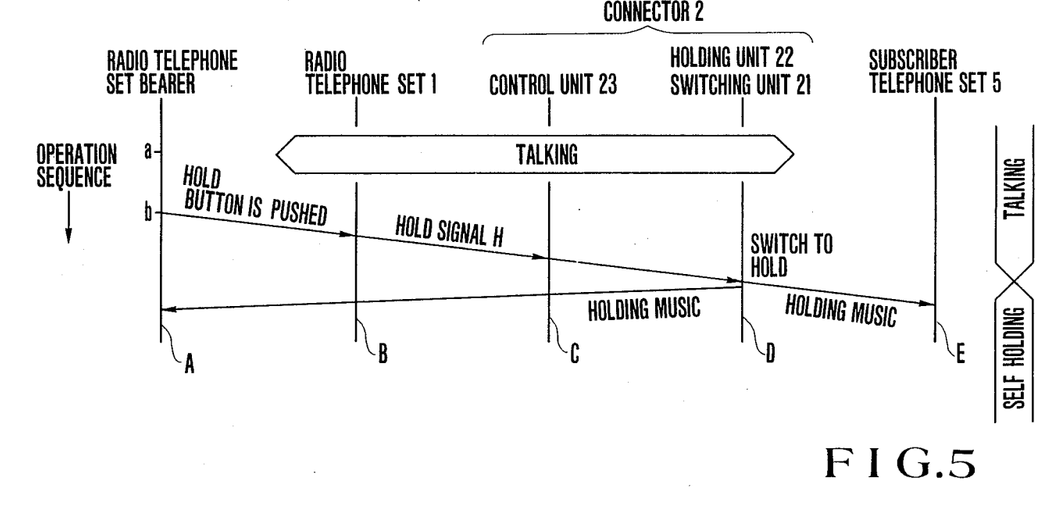
FIGS. 5, 6, 7, and 8 are sequence diagrams for explaining hold control operation in the cordless telephone system according to the present invention.

Referring to FIG. 5 and FIG. 11, in an operation sequence a, the connector 2 establishes the communication channel between the radio telephone set 1, e.g., 1-(1) through the radio channel 3 and the subscriber telephone set 5 through the subscriber telephone line 4. Talking is thus performed between a bearer A of the radio telephone set 1 and a subscriber of the subscriber telephone set 5 (step 110 in FIG. 11). When the bearer A depresses the hold button 17-4 in the radio telephone set 1 in an operation sequence b, the control unit 16 in the radio telephone set 1 generates a hold signal H. An identification number (ID) of the self telephone set 1 is added to the hold signal H, and the composite signal is sent to the transmitter in the radio transmitting/receiving unit 15. At the same time, the hold indicator lamp 18-1 in the display unit 18 is turned on. The hold signal H is transmitted to the connector 2 through the radio channel 3.

Since the first radio signal received during talking is the hold signal H (step 111 in FIG. 11), the control unit 23 in the connector 2 which receives the hold signal H initiates the timer 28, the switching unit 21, and the holding music generating unit 22. The switch in the switching unit 21 is switched to the hold position to set the communication channel in the hold state. At the same time, the holding music is transmitted to the subscriber telephone line 4 and the radio telephone set 1. The radio channel 3 is kept connected. This state (step 112 in FIG. 11) is the self hold state. Time lapse in the self hold state is monitored by the timer 28.

In the self hold state, even if the connector 2 and other radio telephone sets 1, e.g., 1-(2), 1-(3), . . . are off-hooked for a call, the control unit 23 in the connector 2 does not accept such a call request. Calls excluding the one kept in the hold state cannot therefore be connected. The self hold state, i.e., the state in which the radio channel is kept connected, cannot be released by other radio telephone sets. This operation is the same as the conventional hold state.

Figure 6:
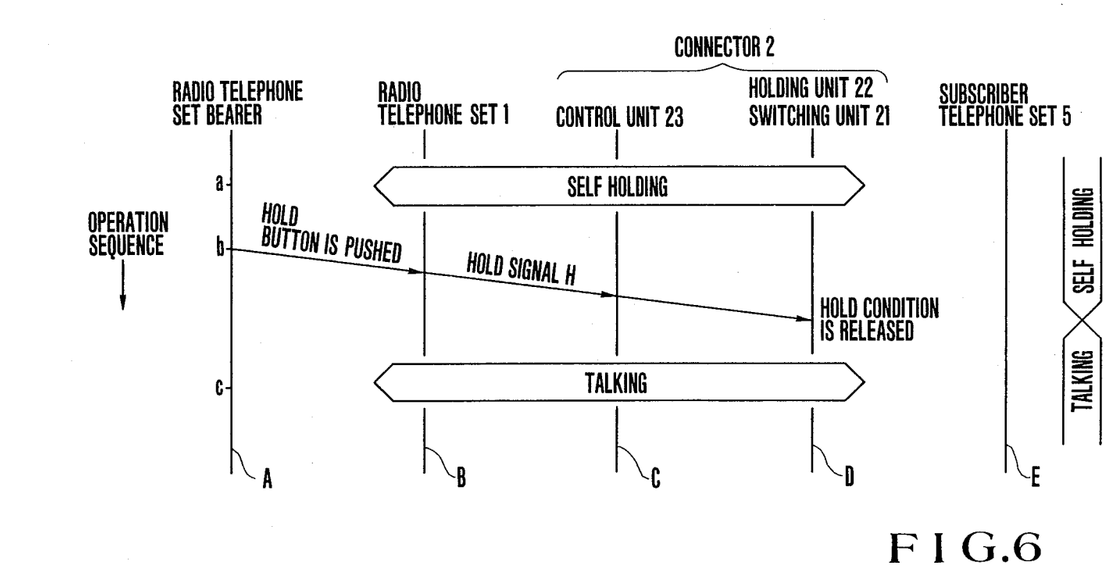

FIG. 6 shows an operation for releasing the self hold state. Referring to FIG. 6 and FIG. 11, in the self hold state in an operation sequence a, when the bearer A of the radio telephone state 1 depresses the hold button 17-4 in order to release the self hold state within a predetermined set time of the timer 28 in an operation sequence b, the control unit 16 detects the operation of the hold button 17-4 (step 113 in FIG.11) and sends the hold signal H including the ID number. As shown in step 114 in FIG. 11, the control unit 23 in the connector 2 receives the hold signal H and causes the switching unit 21 to switch from the hold position to the talk position since the first signal received after holding of the communication channel is a hold signal H. At the same time, the control unit 23 causes the holding music generating unit 22 to stop generating holding music. The timer 28 is reset, and the hold indicator lamp 27-1 is turned off. Talking can be performed in an operation sequence c.

Figure 7:
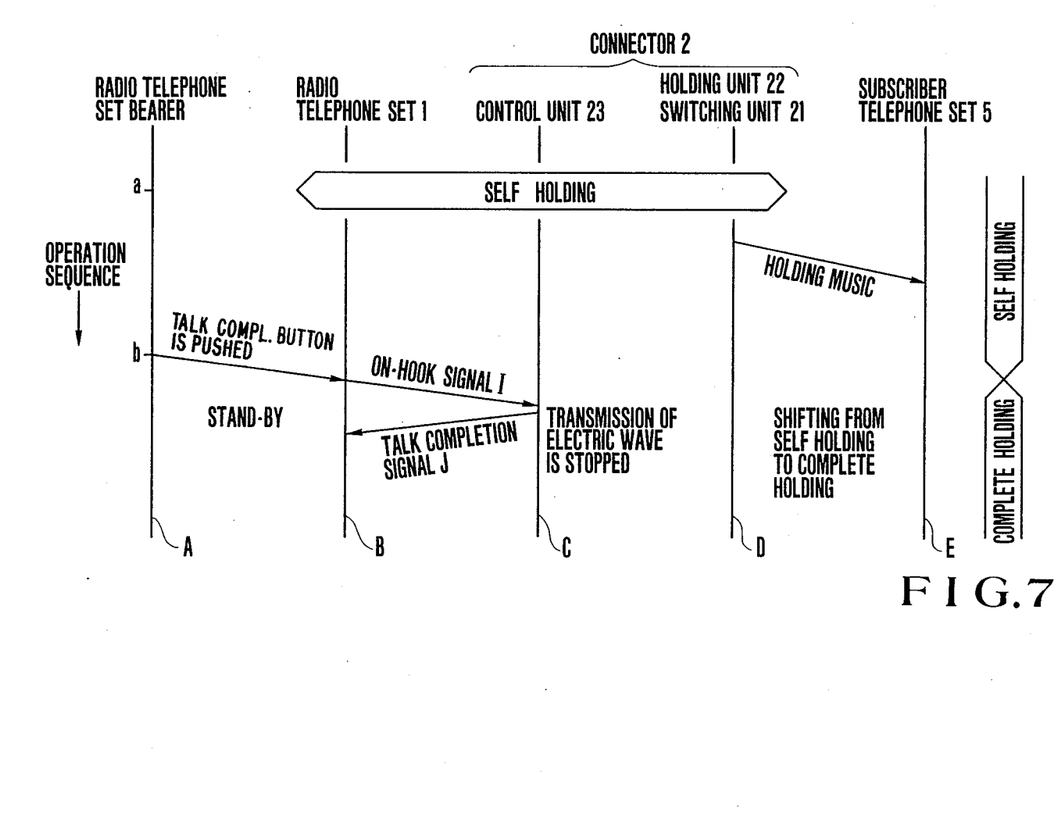

FIG. 7 and step 11b in FIG.11 show an operation when the bearer A changes the radio telephone set 1-(1) to another radio telephone set, e.g., 1-(2). In an operation sequence a, the radio telephone set 1-(1) is set in the self hold state, and then the bearer A depresses the talk completion button 17-3 of the radio telephone set 1-(1) within a time preset in the timer 28, i.e., on-hook operation, in an operation sequence b. The control unit 16 in the radio telephone set 1-(1) sends out an on-hook signal I including the ID number thereof. The control unit 23 in the connector 2 receives the on-hook signal I and transmits a talk completion signal J to the radio telephone set 1-(1) and causes the transmitter in the radio transmitting/receiving unit 26 to stop transmitting the electric wave. The timer 28 is reset. The radio telephone set 1-(1) which receives the talk completion signal J causes the transmitter in the radio transmitting/receiving unit 15 to stop transmitting the electric signal. In other words, the radio channel is disengaged from the radio telephone set 1-(1) and set in the hold state wherein the radio channel is not connected thereto, i.e., the complete hold state.

In the complete hold state, the hold indicator lamp 18-1 in the radio telephone set 1-(1) is turned off, and the hold indicator lamp 27-1 in the connector 2 is turned on to indicate the complete hold state.

In the complete hold state, any radio telephone set including the radio telephone set 1-(1) can make a call and release the hold state of the communication channel. Even in this complete hold state, the holding music is sent to the subscriber telephone set 5.

Figure 8:
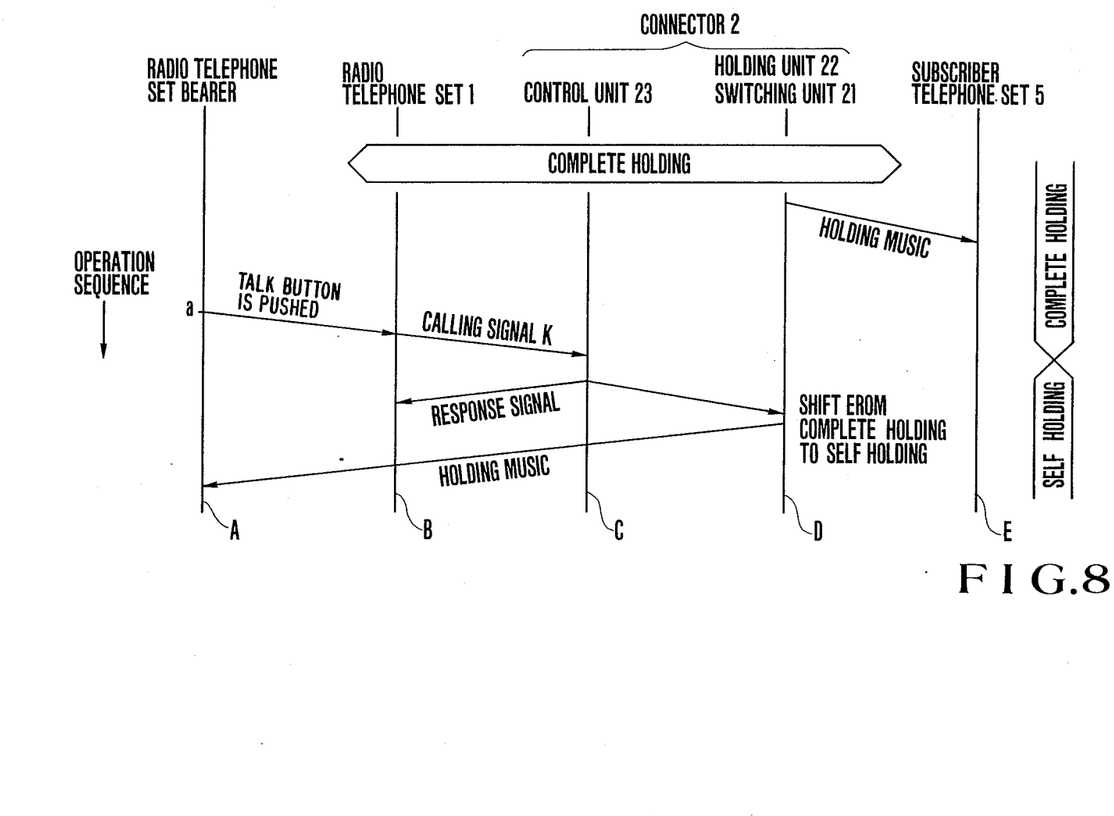
Figure 9:
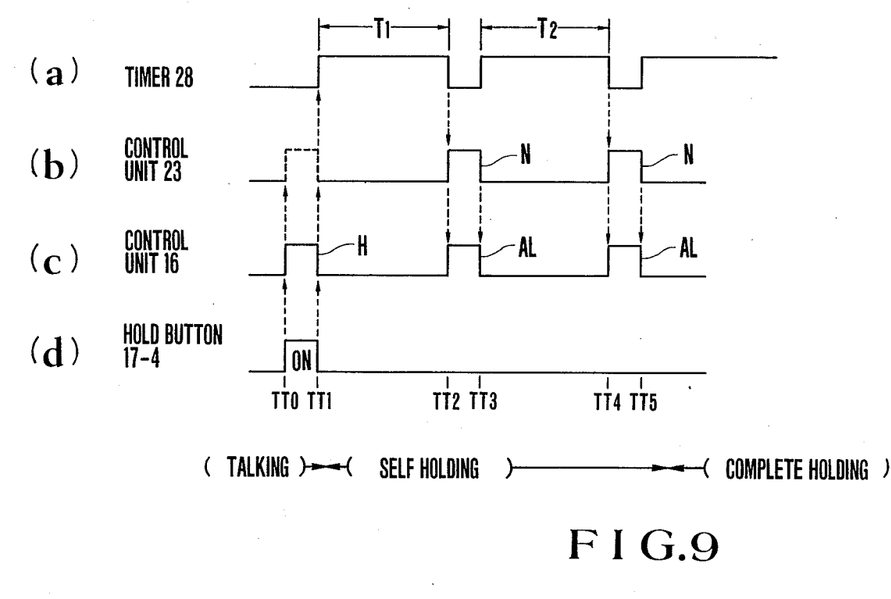
FIGS. 9(a) to 9(d) and 10(a) to 10(f) are timing charts of signals for explaining the control operation of the present invention.
Figure 10:
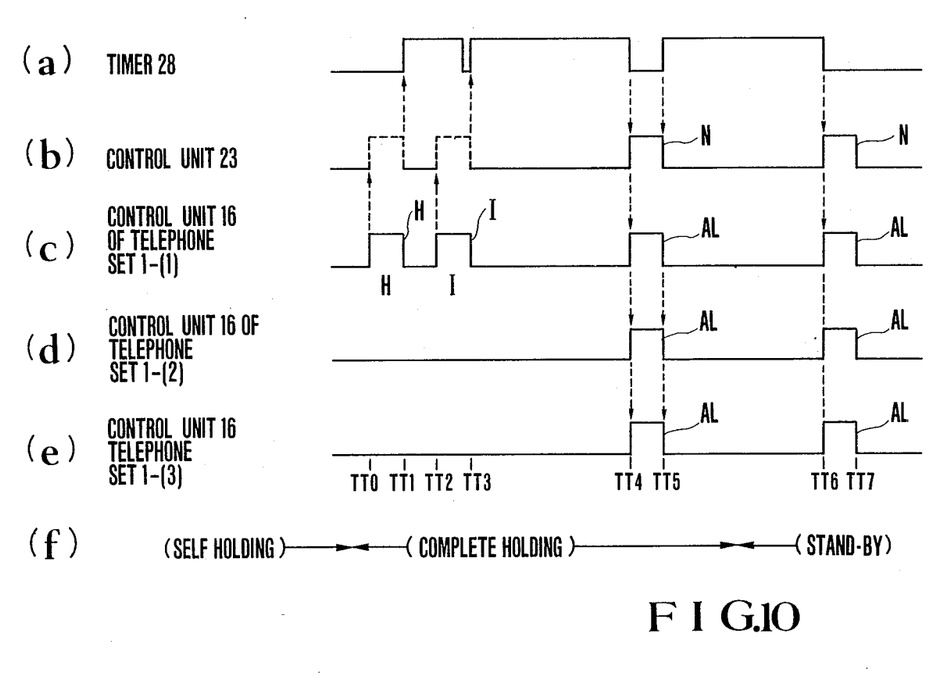

FIG. 8 and step 117 in FIG. 11 show an operation for releasing the complete hold state of the communication channel by a call from any radio telephone set 1, for example 1-(2), in the complete hold state. The bearer of the radio telephone set 1-(2) depresses the talk button 17-2 of the radio telephone set 1-(2) to release the hold state, i.e., off-hook operation in an operation sequence a. The control unit 16 in the radio telephone set 1-(2) then sends a calling signal K including the ID number thereof, and the hold indicator lamp 18-1 is turned on. The control unit 23 in the connector 2 transmits a calling response signal to the corresponding radio telephone set 1-(2). As a result, the radio channel 3 is formed between the radio telephone set 1-(2) and the connector 2, and the self hold state is set.

Since the radio telephone set 1-(2) is set in the self hold state, the hold indicator lamp 18-1 is turned on. Therefore, the bearer of the radio telephone set 1-(2) can talk to the subscriber by depressing the hold button 17-4 (FIG. 6).

An operation will be described wherein the communication channel is disengaged from the radio telephone set 1 and the radio telephone set 1 is set in the stand-by state when the self or complete hold state continues for a long period of time.

Referring to FIGS. 9(a) to 9(d), the control unit 23 in the connector 2 receives the hold signal H from the radio telephone set 1 at time TT0. The self hold state is set at time TT1, and at the same time the timer 28 is operated. When the hold signal H from the radio telephone set 1 is not received before time TT2 at which the time interval T1 set in the timer 28 elapses, a hold alarm signal N is transmitted through the radio channel 3. The control unit 16 in the radio telephone set 1 receives the hold alarm signal N and generates a hold alarm AL in response to the signal N. The control unit 23 in the connector 2 stops transmitting the hold alarm signal N at time TT3 and causes the timer 28 to start. When a time T2 preset in the timer 28 has elapsed at time TT4, the hold alarm signal N is sent to the radio telephone set 1 again. The control unit 16 in the radio telephone set 1 receives this hold alarm signal N and generates the hold alarm AL in response to the signal N again. If the control unit 23 in the connector 2 cannot receive the hold signal H from the radio telephone set 1 before time TT5, the radio channel 3 is disengaged from the radio telephone set 1, and the complete hold state is initiated.

Referring to FIGS. 10(a) to 10(f), the control unit 23 in the connector 2 receives the hold signal H from one radio telephone set, e.g., 1-(1) at time TT1. The control unit 23 receives an on-hook signal I at time TT3 and is set in the complete hold state. At the same time, the timer 28 is started. When holding is not released before time TT4 at which the time preset in the timer 28 elapses, the control unit 23 transmits the hold alarm signal N to all the radio telephone sets 1-(1), 1-(2), ... over an exclusive radio control channel in order to signal to them that holding is continued for a long period of time. The control units 16 of the radio telephone sets which receive the hold alarm signal N generate the hold alarm AL in response to the hold alarm signal N. The control unit 23 in the connector 2 stops transmitting the hold alarm signal N at time TT5. At the same time, the timer 28 is started. When the time preset in the timer 28 has elapsed again at time TT6, the control unit 23 generates the hold alarm signal N again. The control units 16 in the radio telephone sets 1 which receive the hold alarm signal N generate the hold alarm AL in response to the hold alarm signal N again. When holding of any of the radio telephone sets 1 is not released before time TT7 (step 118 in FIG. 11), the communication channel kept in the hold state is forcibly disconnected, and the stand-by state is set (steps 119 and 120 in FIG. 11).

The operations described in FIGS. 9(a) to 9(d) and 10(a) to 10(f) are not independent operations but may be a series of operations. For example, when the self hold state is released upon the lapse of the predetermined period of time and the complete hold state is set, and when the complete hold state is released, the communication channel kept in the hold state is forcibly disconnected and is set in the stand-by state.

According to the cordless telephone apparatus described above, the hold control system for forcibly holding and disconnecting the communication channel is a system capable of performing holding while the radio channel is disconnected. Therefore, during holding which does not require talking, transmission of the electric wave can be stopped, thereby effectively utilizing the electric wave.

Furthermore, when a plurality of radio telephone sets are used, the call held by a given radio telephone set can be released from any other radio telephone set according to the will of the bearer of the given radio telephone set, thereby providing a convenient cordless telephone system.

Furthermore, according to the present invention, even if the bearer forgets to release holding while the radio channel is connected, the radio channel can be disengaged from the radio telephone set, thereby more effectively utilizing the electric wave.

What is claimed is:

1. A cordless telephone system comprising at least one radio telephone set, a subscriber line connected through a telephone exchanger to a subscriber telephone set, and connector means, connected to said at least one radio telephone set through a radio channel and to said subscriber line and having a function for establishing a communication channel between said at least one radio telephone set and said subscriber telephone set and a function for holding said communication channel in response to a hold signal from said at least one radio telephone set, wherein said connector means comprises:

first hold state setting means for setting said communication channel in a first hold state without disconnecting said radio channel in response to the hold signal received upon establishment of said communication channel;

first determining means for determining the presence/absence of a radio reception signal within a first predetermined period of time after the first hold state is initiated;

hold state releasing means for releasing the first hold state and reconnecting the communication channel when the radio reception signal received at first within the first predetermined priod of time is the hold signal in accordance with a determination result of said first determining means;

second hold state setting means for disconnecting said radio channel and setting said communication channel in a second hold state when the radio reception signal received at first within the first predetermined period of time is an on-hook signal or the radio reception signal is not received within the first predetermined period of time, in accordance with the determination result of said first determining means;

second determining means for determining the presence/absence of the radio reception signal within a second predetermined period of time after the second hold state is initiated;

hold state changing means for changing the second hold state to the first hold state when the radio reception signal received within the second predetermined period of time is an off-hook signal, in accordance with a determination result of said second determining means; and circuit control means for forcibly disconnecting said communication channel and setting said communication channel in a stand-by state when the radio reception signal is not received within the second predetermined period of time, in accordance with the determination result of said second determining means.

2. A cordless telephone system comprising at least one radio telephone set, a subscriber line connected through a telephone exchanger to a subscriber telephone set, and connector means, connected to said at least one radio telephone set through a radio channel and to said subscriber line and having a function for establishing a communication channel between said at least one radio telephone set and said subscriber telephone set and a function for holding said communication channel in response to a hold signal from said at least one radio telephone set, wherein said connector means comprises radio transmitting/receiving means connected to said radio channel, control means, incorporating a timer, for controlling operations of said connector means in response to various signals received from said at least one radio telephone set through said radio transmitting-/receiving means, holding tone generating means, controlled by said control means, for generating a holding tone signal representing a hold state, and switching means, controlled by said control means, for connecting said subscriber line and said radio transmitting/receiving means with each other to set a talking state when said communication channel is established, and for connecting an output from said holding tone generating means to said subscriber line and said radio transmitting/receiving means in the hold state; and wherein said control means controls to cause said switching means to disconnect said subscriber line from said radio transmitting/receiving means in response to the hold signal from said at least one radio telephone set during establishment of said communication channel and at the same time cause said holding tone generating means to supply an output signal to said subscriber line and said radio transmitting/receiving means, to set a first predetermined time to said timer and cause said timer to start, to keep connecting said radio channel to said radio transmitting/receiving means, thereby initiating a first hold state, to switch said switching means to a talk position to release the hold state when a radio reception signal received at first within the first predetermined period of time after initiation of the first hold state is the hold signal, to disconnect said radio channel to set a second hold state when the radio reception signal received at first within the predetermined period of time is an on-hook signal or the radio reception signal is not received within the first predetermined period of time, to set a second predetermined time in said timer and cause said timer to start, to change the second hold state to the first hold state in response to a first off-hook signal received within the second predetermined period of time in the second hold state, and to inhibit a transmission function of said radio transmitting/receiving means and set said radio transmitting/receiving means in a stand-by state when the radio reception signal is not received within the second predetermined period of time.

3. A system according to claim 2, wherein said connector means comprises display means, connected to said control means, for displaying the first and second hold states.

4. A system according to claim 2, wherein said radio telephone set comprises operation means for generating said hold signal, said on-hook signal, and said off-hook signal.

5. A system according to claim 2, wherein said connector means further comprises a handset connected to said subscriber line and said radio transmitting/receiving means respectively through said switching means and said control means.

6. A system according to claim 4, wherein said operation means comprises a hold button for generating said hold signal, a talk completion button for generating said on-hook signal, and a talk button for generating said off-hook signal.

* * * * *

UNITED STATES PATENT AND TRADEMARK OFFICE
CERTIFICATE OF CORRECTION

PATENT NO. : 4,876,708

DATED : October 24, 1989

INVENTOR(S) : Saegusa et al

It is certified that error appears in the above-identified patent and that said Letters Patent is hereby corrected as shown below:

Column 5, line 51, delete "11b" and insert --116--;

Column 8, line 4, delete "priod" and insert --period--.

Signed and Sealed this

Fifth Day of February, 1991

Attest:

HARRY F. MANBECK, JR.

Attesting Officer

Commissioner of Patents and Trademarks